United States Patent
Goodnow et al.

(10) Patent No.: US 8,549,335 B2
(45) Date of Patent: *Oct. 1, 2013

(54) SECONDARY POWER UTILIZATION DURING PEAK POWER TIMES

(75) Inventors: Kenneth J. Goodnow, Essex Junction, VT (US); Stephen G. Shuma, Underhill, VT (US); Peter A. Twombly, Shelburne, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/593,837

(22) Filed: Aug. 24, 2012

(65) Prior Publication Data

US 2012/0324255 A1  Dec. 20, 2012

Related U.S. Application Data

(63) Continuation of application No. 12/056,308, filed on Mar. 27, 2008, now Pat. No. 8,301,921.

(51) Int. Cl.
G06F 1/26 (2006.01)
G06F 1/32 (2006.01)

(52) U.S. Cl.
USPC .............. 713/310; 713/300; 713/320

(58) Field of Classification Search
None
See application file for complete search history.

(56) References Cited

U.S. PATENT DOCUMENTS

| | | | |
|---|---|---|---|
| 5,486,749 A | 1/1996 | Brainard | |
| 5,500,561 A | 3/1996 | Wilhelm | |
| 5,631,814 A | 5/1997 | Zak | |
| 5,932,933 A | 8/1999 | Asanuma | |
| 6,455,954 B1 | 9/2002 | Dailey | |
| 7,023,180 B2 | 4/2006 | Nagai et al. | |
| 7,225,086 B2 | 5/2007 | Naitoh et al. | |
| 8,301,921 B2 * | 10/2012 | Goodnow et al. | 713/310 |
| 2003/0078698 A1 | 4/2003 | Bradford | |
| 2003/0085626 A1 | 5/2003 | Odaohhara | |
| 2007/0200433 A1* | 8/2007 | Kelty | 307/66 |
| 2009/0094173 A1 | 4/2009 | Smith et al. | |
| 2009/0127932 A1 | 5/2009 | Warren et al. | |

OTHER PUBLICATIONS

Hatori, M. et al. "Peak-Shift Method for Notebook Computers, a Power Management Approach for Load Leveling", 2004, pp. 117-121.

Notice of Allowance for related U.S. Appl. No. 12/056,308, dated Jul. 2, 2012.

\* cited by examiner

*Primary Examiner* — Dennis M Butler
(74) *Attorney, Agent, or Firm* — David Cain; Roberts Mlotkowski Safran & Cole, P.C.

(57) ABSTRACT

Systems and methods for selectively utilizing secondary power sources during peak power times are provided for. The method includes receiving a notification of a peak power time, and discontinuing use of a primary power supply and beginning use of a secondary power supply based upon the notification.

17 Claims, 8 Drawing Sheets

US 8,549,335 B2

SECONDARY POWER UTILIZATION DURING PEAK POWER TIMES

CROSS REFERENCE TO RELATED APPLICATIONS

The present application is a continuation application of co-pending U.S. application Ser. No. 12/056,308, filed on Mar. 27, 2008, the contents of which are incorporated by reference in its entirety herein.

FIELD OF THE INVENTION

The invention generally relates to the utilization of electric power, and more particularly to systems and methods for selectively utilizing secondary power sources during peak power times.

BACKGROUND OF THE INVENTION

Historical data shows that the demand for electricity placed on the power grid is consistently higher during summer months (e.g., July, August, and September in some geographic regions) than other times of the year. Moreover, there is also an increased demand for electricity during certain hours of the day (e.g., usually around midday of a workday when offices and businesses are operating). These times of increased demand are known as, for example, peak power, peak power time, etc.

The increased demand sometimes pushes the power grid to, or beyond, its supply capability. Numerous methods have been implemented to cope with the associated shortage of supply of electricity. A first method is to generate more power during peak times, for example, utilizing additional power plants which operate only during peak times. However, this method is costly in terms of both money and pollution. That is to say, it is expensive to build and operate additional power plants. Moreover, when the additional power plants take the form of diesel-powered or coal-fired generators, an increase in pollution (e.g., greenhouse gases) is produced.

A second method of dealing with supply shortage of electricity is to intentionally implement brownouts and/or rolling blackouts during peak times. In a brownout, the power supplier (e.g., the power grid) reduces the voltage supplied to all customers, often resulting in the dimming of lights (hence the term brownout). Alternatively, in rolling blackouts, the power supplier intentionally cuts off electrical power to a portion of the grid for a specific amount of time, while providing power to the remaining portions of the grid. When the specified time elapses, the grid portion that is currently blacked out has its electricity re-instated and another different portion of the grid is subsequently blacked out. Brownouts and rolling blackouts have the very noticeable drawback of denying electricity to customers, which can be costly to businesses (e.g., especially those that rely on refrigeration) and dangerous for people and pets (e.g., lack of air conditioning has led to heat stroke and even death during some heat waves).

A third method for dealing with excessive demand during peak times is to dissuade customers from using electricity by increasing the price for the electricity during these times. For example, some power providers charge customers as much as 16% more per kilowatt hour during peak times in order to curtail usage during these times. This places customers, particularly large users such as businesses, in a dilemma: use the same amount of electricity, thereby absorbing the full effect of price increases, or electively reduce electricity usage during peak time with the possible disadvantage of being less productive.

Accordingly, there exists a need in the art to overcome the deficiencies and limitations described hereinabove.

SUMMARY OF THE INVENTION

In a first aspect of the invention, there is a system for implementing a greenout comprising at least one device operable by a primary power supply and a secondary power supply. The system also comprises a controller that causes the at least one device to discontinue using the primary power supply and begin using the secondary power supply based upon data from a notification system.

The at least one device may comprise a laptop computer. Also, the primary power supply may comprise a power grid and the secondary power supply may comprise at least one off: a battery, and a backup generator. The battery may be a rechargeable battery. The at least one device may include the controller. For example, the controller may comprise a software program stored on a computer readable medium. Alternatively, the controller may be separate from the at least one device. For example, the controller may comprise a computing device when the at least one device comprises a plurality of computing devices.

In embodiments, the data is received by at least at least one of: an additional portion of a nominal sinusoidal alternating current signal; a series of on and off states of the primary power supply; a message broadcast by the notification system over a network; and a message posted by the notification system and accessed by the controller over a network. In additional embodiments, the data comprises at least one of: date and time of at least one of a brownout, blackout, and price increase; and geographic location of the at least one of a brownout, blackout, and price increase.

In another aspect of the invention, there is a method for implementing a greenout comprising receiving a notification of a peak power time, and discontinuing use of a primary power supply and beginning use of a secondary power supply based upon the notification.

The method may further comprise performing the discontinuing and the beginning at a time and date specified in the notification. Additionally, the method may comprise performing the discontinuing and the beginning in a geographic location specified in the notification. In embodiments, the receiving comprises at least one of: decoding an additional portion of a nominal sinusoidal alternating current signal of the primary power supply; decoding a series of on and off states of the primary power supply; receiving a message broadcast over a network; and accessing, via a network, a message posted by a notification system.

The receiving may be performed by a controller and the discontinuing may be performed by at least one device. The at least one device may comprise a laptop computer and the controller may comprise a program stored on the laptop computer. Alternatively, the at least one device may comprise a plurality of laptop computers operatively connected to the controller. In further embodiments, the primary power supply comprises a power grid and the secondary power supply comprises a battery.

In another aspect of the invention, a computer program product comprising a computer usable medium having a computer readable program embodied in the medium. The computer readable program, when executed on a device, causes the device to receive a notification of a peak power time, and discontinue use of a primary power supply and begin use of a secondary power supply based upon the notification.

The computer readable program may further cause the device to perform the discontinuing and the beginning at a time and a date specified in the notification. The computer readable program may also cause the device to perform the discontinuing and the beginning at a geographic location specified in the notification.

In embodiments, the receiving comprises at least one of: decoding an additional portion of a nominal sinusoidal alternating current signal of the primary power supply; decoding a series of on and off states of the primary power supply; receiving a message broadcast over a network; and accessing, via a network, a message posted by a notification system.

In an even further aspect of the invention, there is a method for implementing a greenout comprising determining a peak power event of a primary power supply. The method also comprises notifying at least one device that is capable of operating on the primary power source and a secondary power source of the peak power event so that the at least one device may elect to discontinue using the primary power source and begin using the secondary power source.

The notifying may comprise notifying the at least one device of a date and time of the peak power event by at least one of: adding a portion to a nominal sinusoidal alternating current signal of the primary power supply; causing a series of on and off states of the primary power supply; broadcasting data to the at least one device over a network; and posting a message to a network, wherein the message is accessible by the at least one device. Moreover, the at least one device may comprise a plurality of devices, and the broadcasting may comprise sending the data to an IP address or MAC address of each of one of the plurality of devices.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The invention generally relates to the utilization of electric power, and more particularly to systems and methods for selectively utilizing secondary power sources during peak power times. For example, aspects of the invention may be used to determine when a peak power time will exist and selectively switch an electricity-using device from a primary power source to a secondary power source during that peak power time. Exemplary embodiments of the invention comprise a notification system that provides data to devices identifying when peak power time will exist. In this manner, devices can participate in a "greenout," e.g., a voluntary reduction of primary power source usage to avoid brownouts, blackouts, and increased costs, while maintaining operational capability.

Figure 1:
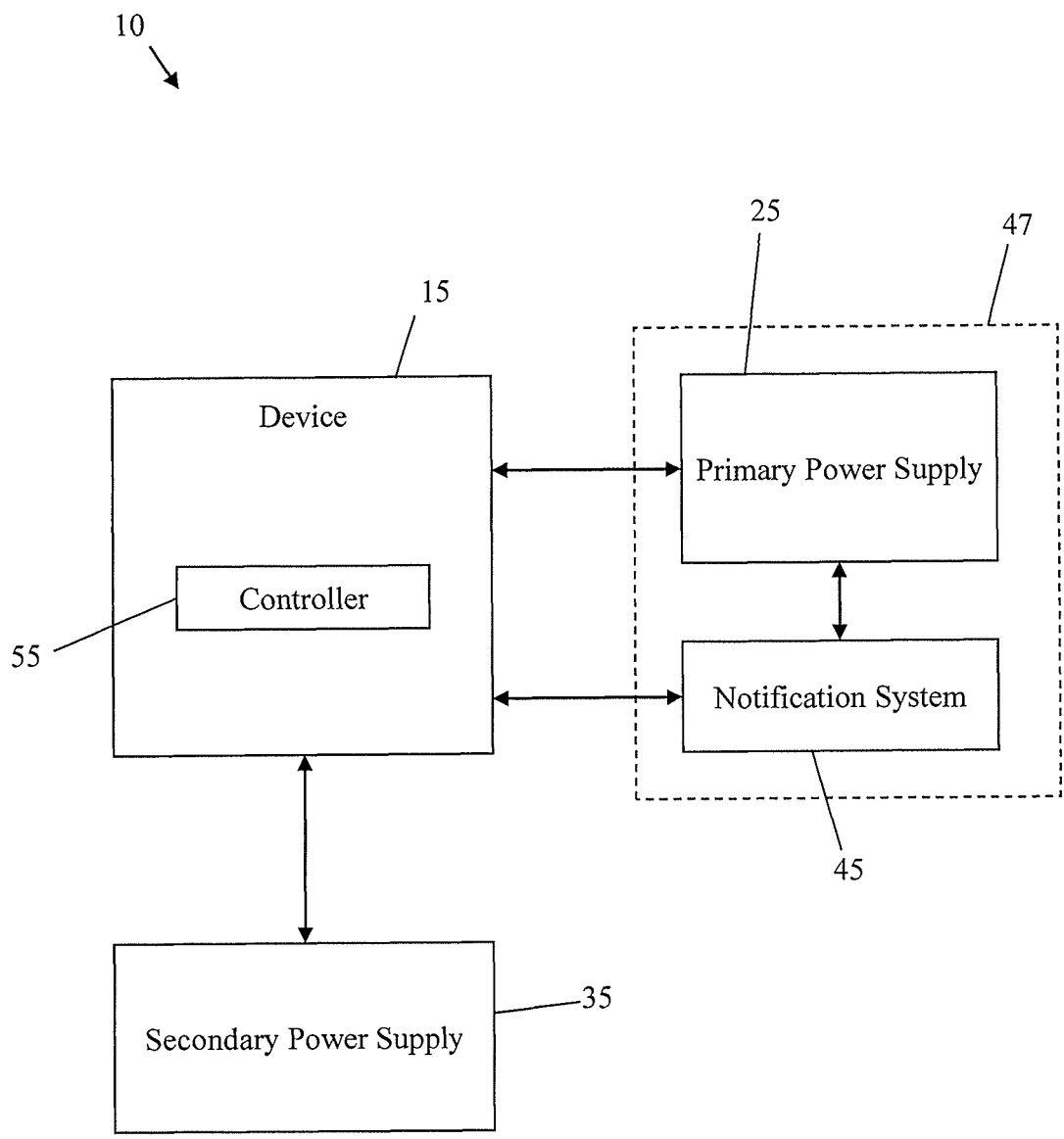
FIGS. 1-5 show exemplary systems in accordance with aspects of the invention.

FIG. 1 shows a system 10 for utilizing secondary power according to aspects of the invention. In embodiments, the system comprises a device 15 that utilizes electricity from a primary power supply 25. The device 15 may comprise any device or system that utilizes electricity, such as a laptop computer, although the invention is not limited to use with laptop computers and any suitable device may be used within the scope of the invention. The primary power supply 25 may comprise, for example, the power grid, such as a local utilities provider, as should be understood by those of ordinary skill in the art such that further explanation is not believed necessary. The device 15 is operatively connected to the primary power supply 25 via, for example, an electrical cord and wall outlet.

The device 15 is also operatively connected to a secondary power supply 35, such as, for example a battery, backup generator, etc., such that the device 15 is capable of operating by using electricity from either the primary power supply 25 or the secondary power supply 35. In the example where the device 15 is a laptop computer, the secondary power supply 35 comprises a rechargeable battery (e.g., such as that typically sold with, or as part of, the laptop computer), and the device 15 includes a conventional combination of hardware and software for operating in at least the following states: (i) operating the device and/or re-charging the battery using electricity from the primary power supply 25 when the device 15 when connected to the primary power supply 25 (e.g., plugged into the wall outlet); and (ii) operating using electricity from the battery when the device 15 is not connected to the primary power supply 25.

Still referring to FIG. 1, the system further comprises a notification system 45, which provides data identifying when a brownout, rolling blackout, or price increase of the electricity associated with the primary power supply 25 will occur. For purposes of this disclosure, the phrase "peak power time" is used to signify a time period during which the electricity provided by the primary power supply 25 is intentionally subject to at least one of a brownout, rolling blackout, and a time-of-day-based price increase.

In embodiments of the invention, the device 15 is operatively connected to the notification system 45 so that the device 15 has access to data regarding upcoming peak power times. In this manner, according to aspects of the invention, the device 15 may electively opt to switch to the secondary power supply 35 during the peak time (e.g., the device may elect to participate in a greenout). In implementations of the invention, the notification system 45 comprises a computing device that is programmed with data by an entity that operates the primary power supply 25. For example, the notification system 45 may comprise a computing device that is associated with or controlled by a utility provider (as indicated by box 47), wherein the utility provider programs the computing device with data indicating what dates and during what times peak power time will be in effect. However, the data need not be confined to a date and time of a peak power event, but rather the data provided by the notification system 45 may be any type of data associated with the primary power supply 25 (e.g., that a peak power event will end at a different time than previously posted, etc.). Moreover, the notification system 45 need not be associated with or controlled by a utility provider, and can be any system that is based upon data regarding peak power time (for example, the notification system 45 can be at least one of owned, operated, and maintained by a third party).

In embodiments, a controller 55 receives the data from the notification system 45 and causes the device 15 to switch from the primary power supply 25 to the secondary power supply 35 at an appropriate time. For example, the controller 55 may be part of the device 15, such a software program installed on a laptop computer that accesses the data from the notification system 45 and, based upon that data, automatically causes the device laptop to switch to battery power (e.g., instead of wall power) during the peak power time. In this manner, the laptop can remain fully operational during peak power time, without having to assume the risks associated with peak power time (e.g., brownouts, blackouts, increased price, etc.).

Figure 2:
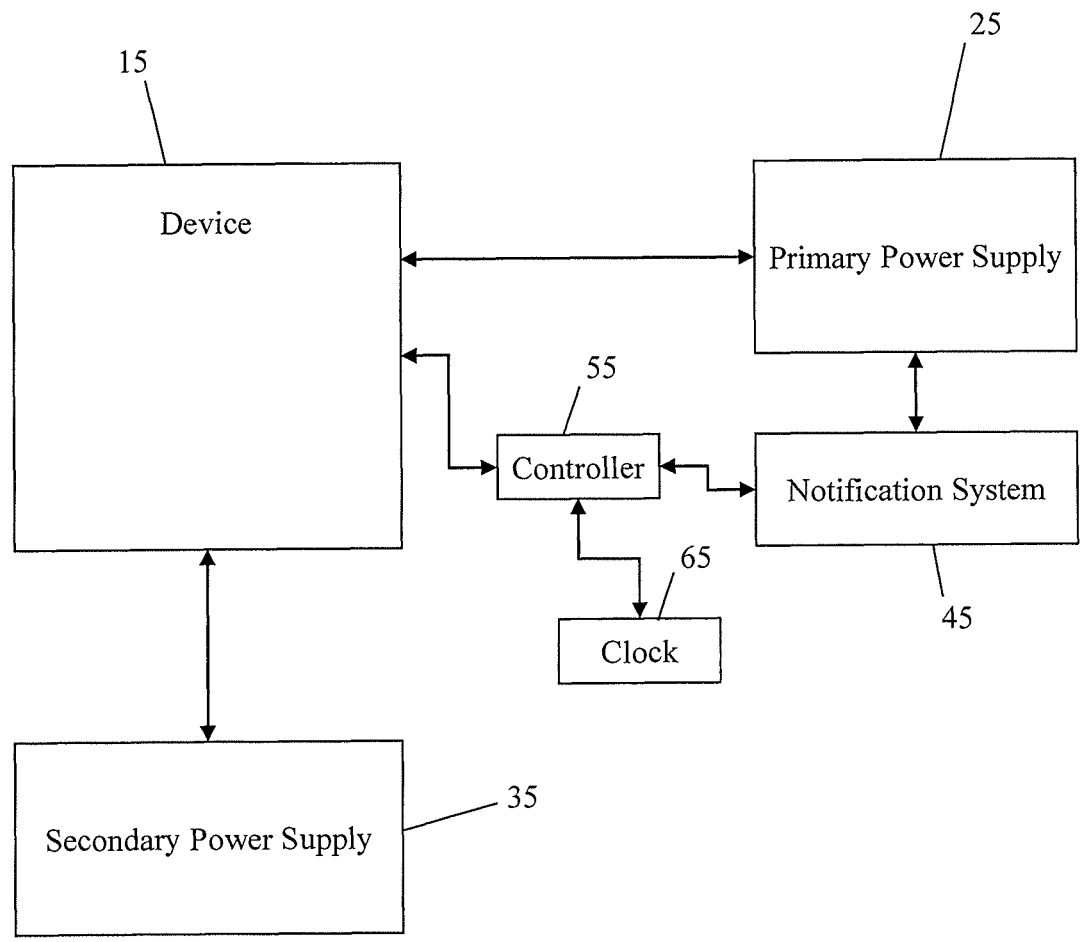

In alternative embodiments, the controller 55 may be external to the device 15, such as, for example, in the implementation depicted in FIG. 2. More specifically, the controller 55 receives the data from the notification system 45. Based upon the peak power time data and data from a real time clock 65, the controller 55 communicates a signal to the device 15 to instruct the device when to switch from the primary power supply 25 to the secondary power supply 35. In this embodiment, the device 15, such as for example, a laptop computer, is connected to both the primary power supply 25 and the secondary power supply 35, such that the device 15 performs the physical switching between the two power supplies. The controller 55 in this embodiment may comprise, for example, a stand-alone computing device that is dedicated for the purpose of receiving data from the notification system 45 and providing signals to the device 15. In the example where the controller 55 comprises a computing device, the clock 65 may be comprised in the computing device.

The data of the notification system 45 can be communicated to the device 15 in any number of ways according to aspects of the invention. In a first embodiment, the notification system 45 adds a high frequency signal portion to the nominal 120 volt AC sinusoidal power signal that travels from the primary power supply 25 to the device 15. The technology for adding an additional signal portion to the power signal is known, such that further explanation is not believed necessary. In embodiments of the invention, the added high frequency signal portion includes the data regarding the peak power time (e.g., dates and times that peak power will be in effect). The device 15 receives the high frequency signal portion with the power signal from the primary power supply 25, separates the high frequency signal portion from the power signal, and decodes the high frequency signal portion to obtain the data regarding the peak power time.

In another embodiment, the peak power time data of the notification system 45 is coded as a series of off-on pulses of the nominal 120 volt AC sinusoidal power signal that travels from the primary power supply 25 to the device 15. In this example, the notification system 45 cooperates with the primary power supply 25 to cause the normal power signal to turn on and off (possibly multiple times) in a predetermined pattern. The device 15 is programmed to recognize the various predetermined patterns, such that the peak power time data can be obtained by the device 15 by decoding the series of off-and-on pattern received via the primary power supply 25.

In a further embodiment, the peak power time data of the notification system 45 is obtained by the device 15 via a network connection, such as, for example, via the Internet, LAN, WAN, wireless network. In a first network notification embodiment, the device 15 provides its IP address (or other suitable identification information) to the notification system 45, which stores the IP address in a list of IP addresses. Prior to a peak power time condition by the primary power supply 25, the notification system 45 broadcasts a message (e.g., the data) to all of the IP addresses in the list of IP addresses. In this manner, the notification system 45 broadcasts the data to all pre-identified devices 15 via the network (e.g., the Internet).

Some devices do not have a static IP address, but rather change IP addresses frequently (e.g., by being assigned a dynamic IP address by an Internet Service Provider (ISP) or via some LAN/WAN systems). In this case, according to aspects of the invention, the device 15 is programmed to send a message to the notification system 45 of its current IP address each time the device 15 connects to the primary power supply 25, or alternatively each time the device 15 detects a change in its IP address from the last IP address that it reported to the notification system 45. In this manner, the notification system 45 may routinely update its list of IP addresses, such that devices 15 that use dynamic IP addresses can be accommodated.

In an even further embodiment, the device 15 obtains the peak power time data from the notification system 45 by periodically polling the notification system 45 via a network (e.g., the Internet, LAN, WAN, wireless network, etc.). More specifically, the notification system 45 may have an IP address (or other network identification) that is known to the device 15, and at which IP address the notification system posts messages that are readable by the device 15 via the network. Periodically (e.g., every 30 minutes) the device 15 sends a message via the network to the notification system 45 to see if new data regarding an upcoming peak power time has been posted. In this manner, instead of the data being pushed from the notification system 45 to the device 15 (as described above), the data is pulled by the device 15 from the notification system 45. Additionally or alternatively, in order to reduce network traffic, an network server (e.g., at an ISP) may store the data posted by the notification system 45 so that primarily local network traffic occurs (instead of multiple devices all contacting the notification system 45).

Figure 3:
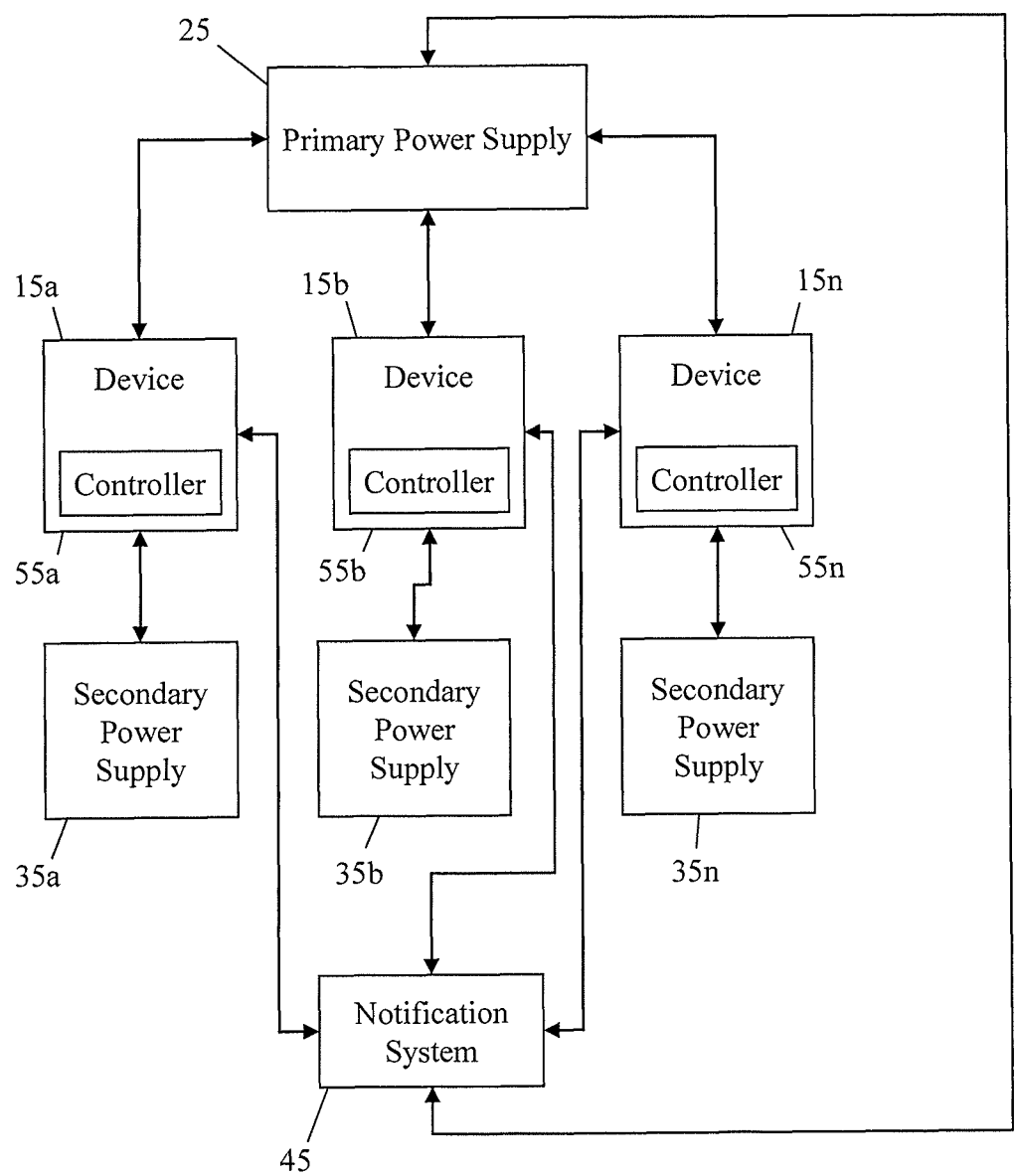

Although embodiments of the invention have been described thus far with respect to a single device 15, the invention is not limited to use with a single device 15. Instead, any desired number of devices can be used within the scope of the invention. For example, as shown in FIG. 3, plural devices 15a, 15b, ... 15n may be connected to the primary power supply 25 and notification system 45, where each device comprises its own secondary power supply 35a, 35b, ... 35n and controller 55a, 55b, ... 55n, respectively. Moreover, the notification system 45 may use any combination of the above-described methods to notify the 15a, 15b, ... 15n of the peak power time. For example, the notification system may add a portion to the nominal sinusoidal alternating current signal of primary power supply to notify first device 15a, while broadcasting a network message to notify device 15b.

Take, for instance, an example of an industrial park with five thousand employees each using laptop computers. The average laptop computer consumes about 50 watts per hour during normal operation, such that these five thousand employees consume about 250 kW of power per hour when all of the laptops are plugged into the wall socket (e.g., using primary power). By utilizing aspects of the invention to operate on secondary power for about two hours (e.g., the normal amount of operating time for a laptop battery) during peak power time, these five thousand employees can reduce the demand on the electricity provider by about 500 kW during peak power time.

Figure 4:
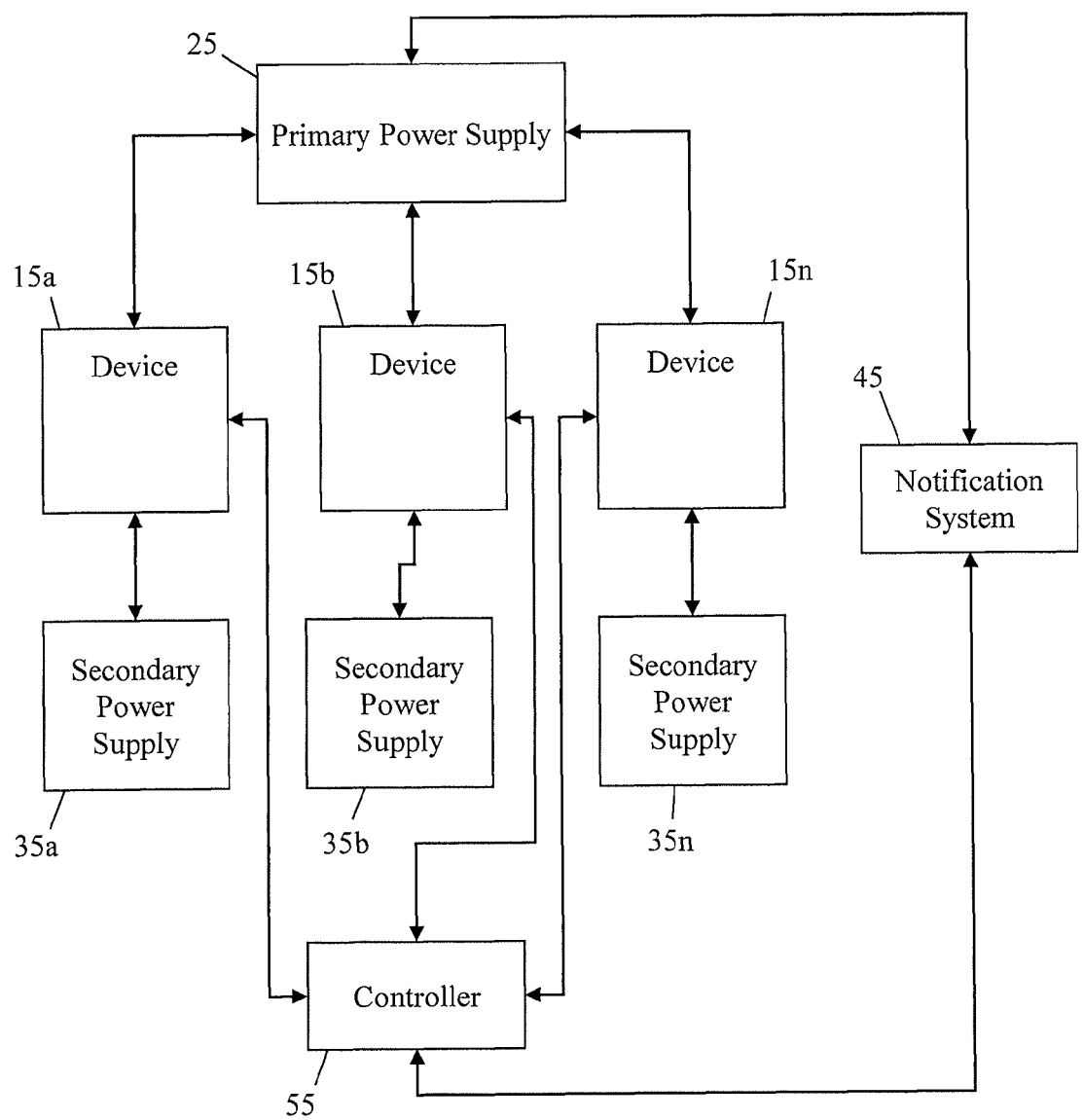

Additionally or alternatively, a single controller 55 may be used with plural devices 15a, 15b, ... 15n, as shown in FIG. 4. For example, a single controller 55 may be operatively connected to the notification system 45 and to plural devices 15a, 15b, ... 15n. In this manner, the controller 55 receives the data from the notification system 45 and passes the appropriate information to each of the devices 15a, 15b, ... 15n.

Figure 5:
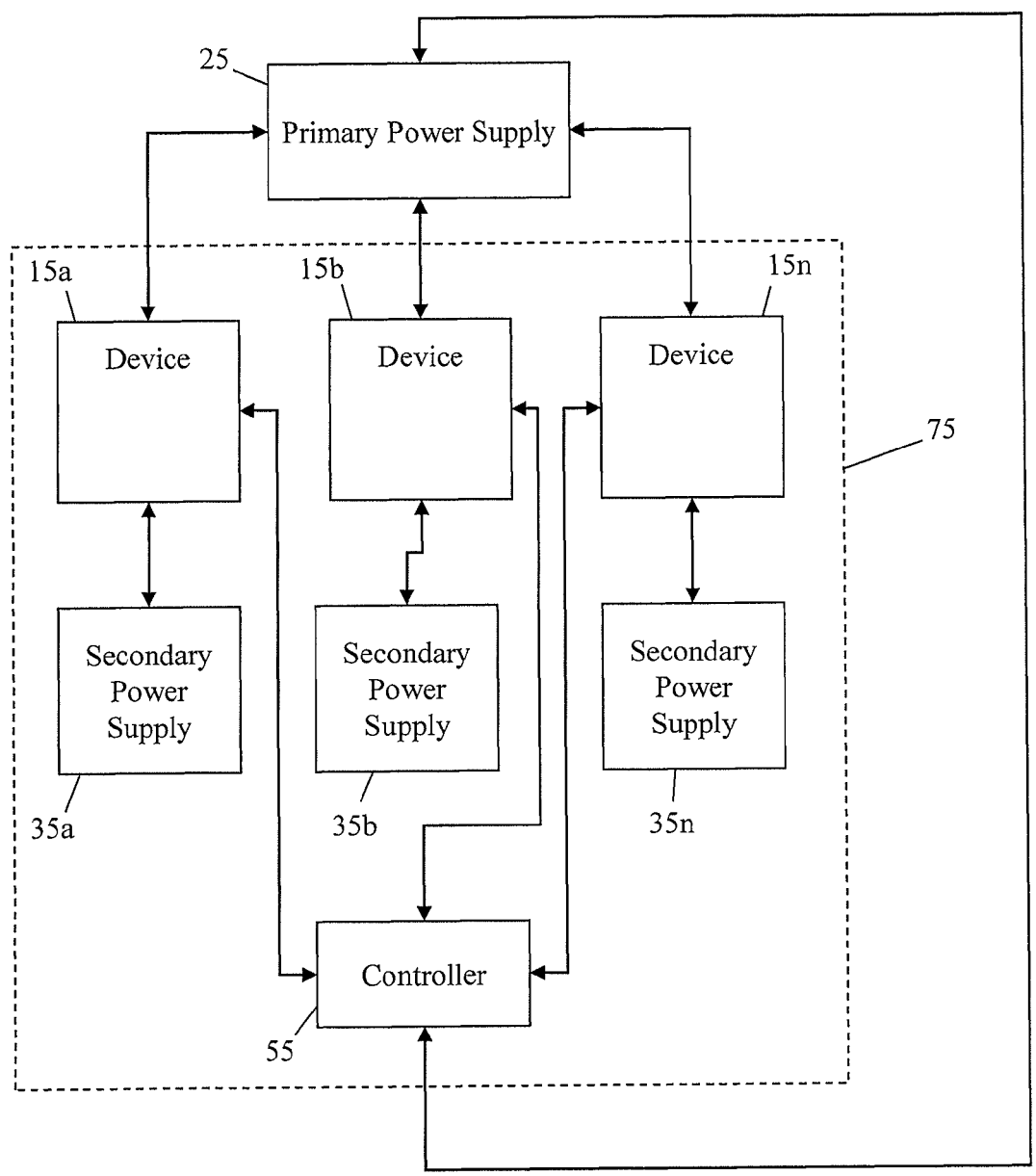

Additionally or alternatively, a controller 55 associated with a group of devices 15a, 15b, ... 15n may cause certain ones of the devices 15a, 15b, ... 15n to switch to secondary power without receiving data from a notification system. For example, as depicted in FIG. 5, the controller 55 may be associated with an entity 75 (e.g., data center, building, etc.) that has a fixed power budget (e.g., the entity 75 can only draw up to a specific amount of electricity from the primary power supply 25). The controller 55 may be structured and arranged to determine the total amount of power that is being drawn by the entity 75 from the primary power supply 25. When the total amount of power that is being drawn by the entity 75 equals or exceeds a predetermined value (e.g., 95% of the maximum amount allowed by the budget), the controller 55 may instruct the devices 15a, 15b, . . . 15n to switch to their secondary power supplies. In this manner, implementations of the invention allow the entity 75 to operate within budget.

In even further embodiments of the invention, the controller 55 may communicate back to the notification system 45 that the device 15 (or devices, if the controller 55 is associated with plural devices 15) will use secondary power for a defined period of time. For example, in the case of laptop computers, based upon the expected battery life of each laptop computer, the controller 55 may determine the amount of time that each laptop computer will be off of the primary power supply 25. The controller 55 may communicate this information back to the notification system 45 (e.g., via network communication), which in turn may relay the information to the operator of the primary power supply 25. In this manner, the operator of the primary power supply 25 may better predict total demand on the system, and make any desired changes to supply accordingly.

Although the invention has been described with respect to data that indicates peak power times (e.g., date and hours), in another aspect of the invention, the data may also comprise information related to the geographic location where the peak power time will be in effect. For example, the notification system 45 may broadcast a message to plural devices 15, where the message indicates a date, a range of time during that date, and a geographic location (e.g. portion of a grid, zip code, municipality, etc.) for which peak power time will apply. In this manner, only devices that are within the identified geographic region need be concerned about moving to secondary power during the peak power time.

Figure 6:
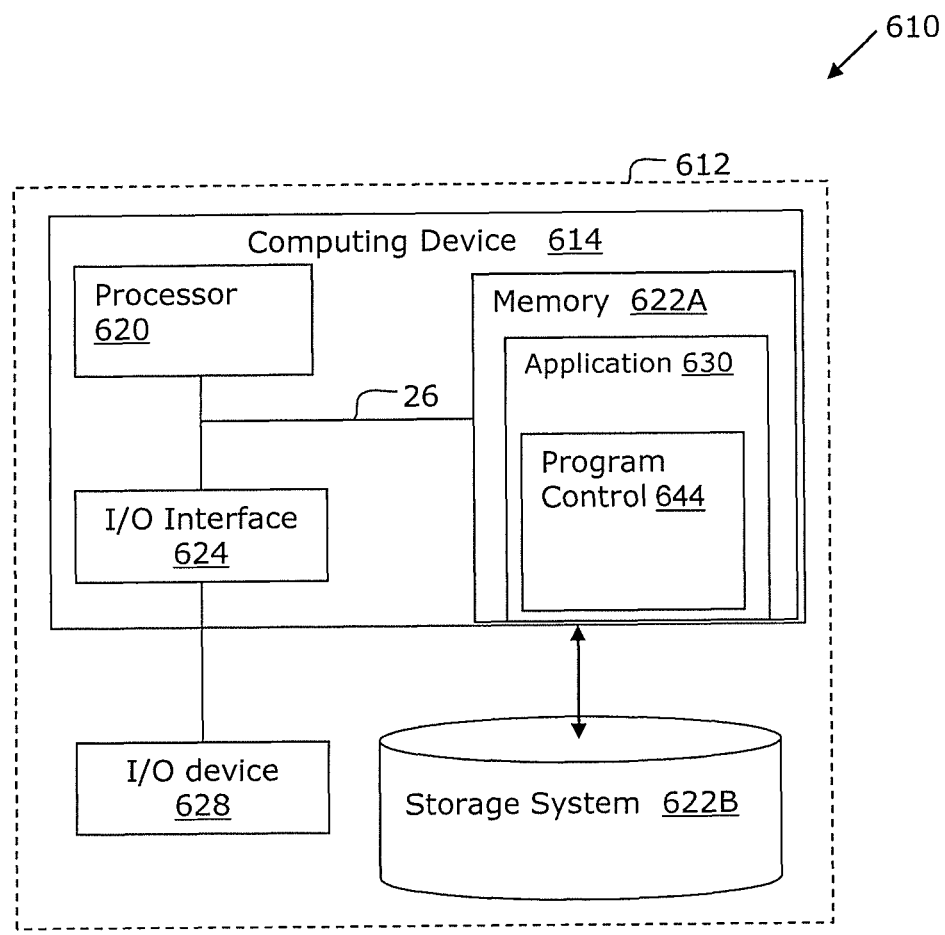
FIG. 6 shows an illustrative environment for implementing the steps in accordance with the invention.

FIG. 6 shows an illustrative environment 610 for managing the processes in accordance with the invention. To this extent, the environment 610 includes a computer infrastructure 612 that can perform the processes described herein. In particular, the computer infrastructure 612 includes a computing device 614 that comprises an application 630 having a program control 644, which makes the computing device 614 operable to perform the processes described herein, such as, for example, notifying or being notified of a peak power event and providing the capability of utilizing secondary power sources during peak power times. For example, the controller 55 described above with respect to FIGS. 1-5 may comprise the computing device 614 wherein the computing device is operatively connected to the notification system 45 and one or more devices 15. Alternatively, the device 15 described above with respect to FIGS. 1-5 may comprise the computing device 614 in which the controller 55 is embodied as the program control 644. However, the invention is not limited to these two specific examples, and any suitable arrangement of controller 55 and device 15 may be used within the scope of the invention.

The computing device 614 includes a processor 620, a memory 622A, an input/output (I/O) interface 624, and a bus 626. The memory 622A can include local memory employed during actual execution of program code, bulk storage, and cache memories which provide temporary storage of at least some program code (e.g., program control 644) in order to reduce the number of times code must be retrieved from bulk storage during execution. Further, the computing device 614 is in communication with an external I/O device/resource 628 and a storage system 622B. The I/O device 628 can comprise any device that enables an individual to interact with the computing device 614 or any device that enables the computing device 614 to communicate with one or more other computing devices using any type of communications link. The external I/O device/resource 628 may be keyboards, displays, pointing devices, etc.

The processor 620 executes computer program code (e.g., program control 644), which is stored in memory 622A and/or storage system 622B. While executing computer program code, the processor 620 can read and/or write data to/from memory 622A, storage system 622B, and/or I/O interface 624. The bus 626 provides a communications link between each of the components in the computing device 614.

The computing device 614 can comprise any general purpose computing article of manufacture capable of executing computer program code installed thereon (e.g., a personal computer, server, wireless notebook, smart phone, personal digital assistant, etc.). However, it is understood that the computing device 614 is only representative of various possible equivalent computing devices that may perform the processes described herein. To this extent, in embodiments, the functionality provided by the computing device 614 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 612 is only illustrative of various types of computer infrastructures for implementing the invention. For example, in embodiments, the computer infrastructure 612 comprises two or more computing devices (e.g., a server cluster) that communicate over any type of communications link, such as a network, a shared memory, or the like, to perform the processes described herein. Further, while performing the processes described herein, one or more computing devices in the computer infrastructure 612 can communicate with one or more other computing devices external to computer infrastructure 612 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein, such as, for example, utilizing secondary power sources during peak power times. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Processes of the Invention

The steps of the flow diagrams described herein may be implemented in the environments of FIGS. 1-6. The flow diagrams may equally represent a high-level block diagram of the invention. The steps of the flow diagrams may be implemented and executed from a server, in a client-server relationship, by computing devices in an ad hoc network, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environments of FIGS. 1-6. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 7:
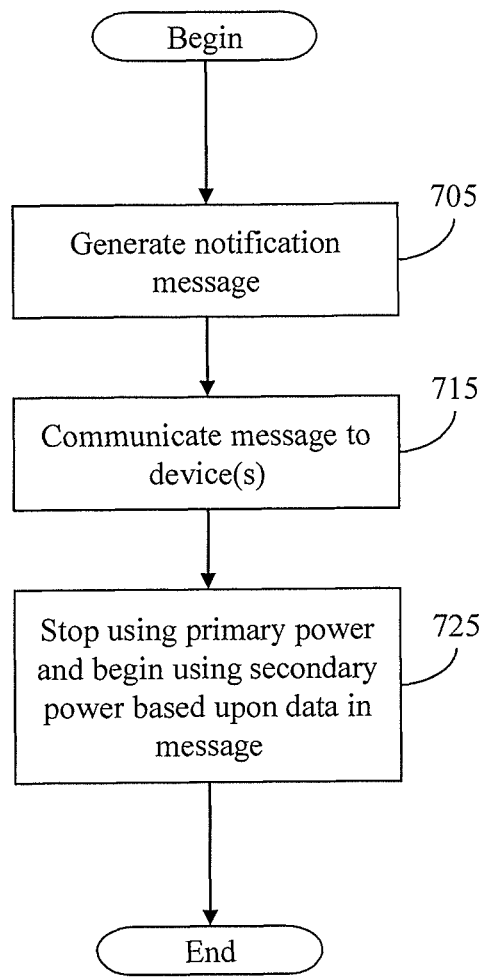
FIGS. 7 and 8 show flow diagrams depicting implementations of methods according to aspects of the invention.

FIG. 7 shows a flow diagram depicting steps of a method according to aspects of the invention. At step 705, a notification system generates data regarding an upcoming peak power time. The notification system may be, for example, that described above with respect to FIGS. 1-5. For example, a power provider (e.g., an electricity provider for a region, municipality, etc.) may generate a message indicating that a price increase will be in effect between 1:00 PM and 3:00 PM on the following business day.

At step 715, the message is communicated from the notification system to at least one device (such as, for example, device 15 described above with respect to FIGS. 1-5). The communication may be accomplished, for example, as described with respect to FIGS. 1-5. For example, the message may be communicated from the notification system to a controller contained in a device, to a plurality of devices each having a respective controller, and/or to a single controller that relays the data of the message to a plurality of devices. Moreover, the data of the message in step 715 may be at least one of: added to the primary power supply signal, communicated as a predetermined pattern of on-off states of the primary power supply signal, broadcast by the notification system over a network (e.g., Internet, LAN, WAN, wireless network, etc.), and polled by the device(s) contacting the notification system over a network (e.g., Internet, LAN, WAN, wireless network, etc.).

At step 725, the device (or plural devices) switches to utilizing a secondary power supply instead of the primary power supply based upon the data contained in the message. The may be accomplished, for example, as described with respect to FIGS. 1-5. For example, a controller may instruct a laptop computer device to switch to battery power at a specific time based upon an identification of a peak power time contained in the message. In this manner, entities utilizing implementations of the invention may voluntarily participate in a greenout based upon a notification by the primary power supplier.

Figure 8:
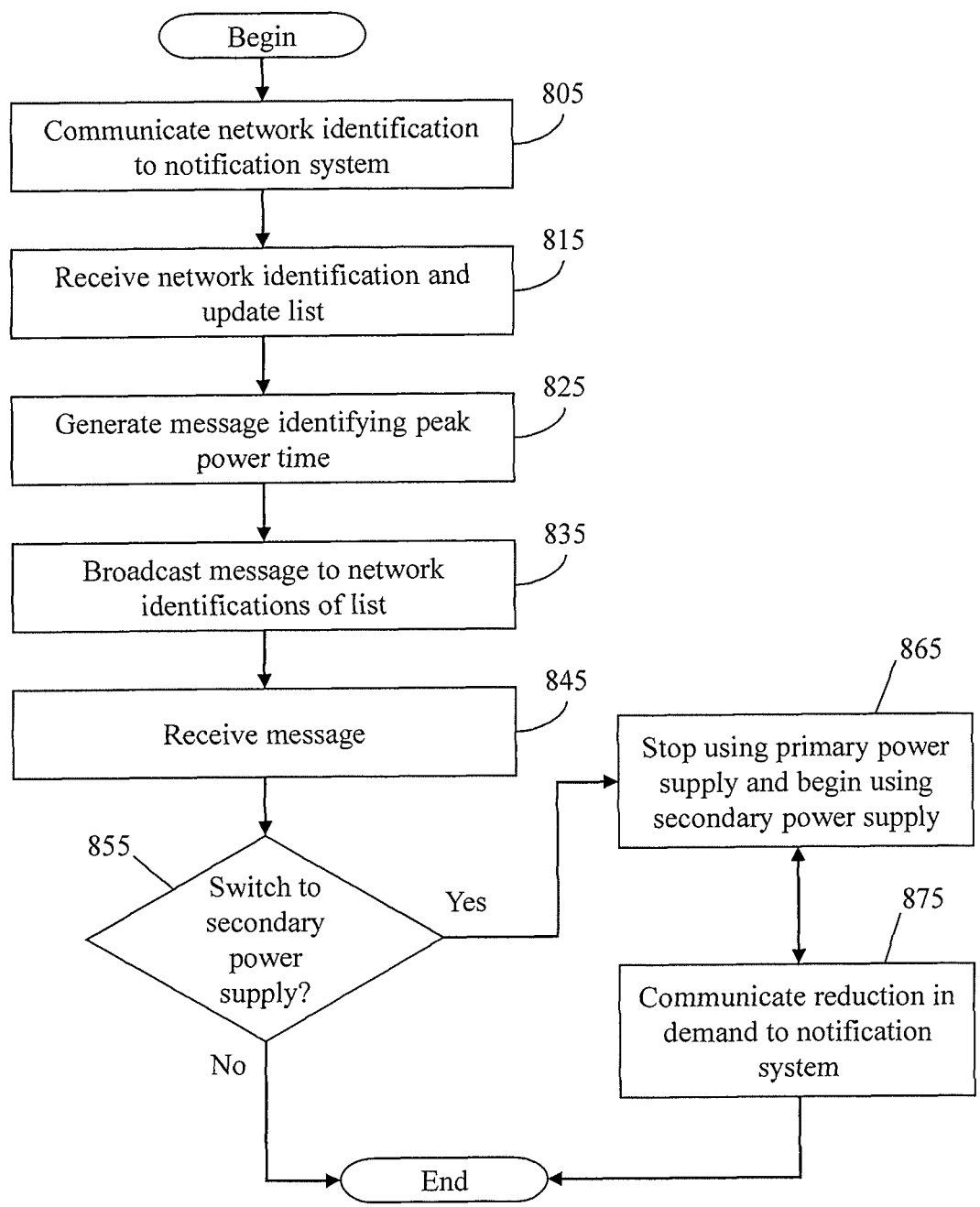

FIG. 8 shows steps of another method according to aspects of the invention. At step 805, a controller sends its network identification to a notification system. This may be accomplished, for example, as described above with respect to FIGS. 1-5. For example, the controller may reside as a software program on a laptop computer having a rechargeable battery. Alternatively, the controller may comprise a computer (e.g., a server) that is operatively connected to a plurality of laptop computers each having a rechargeable battery. The network identification may comprise, for example, an IP address (static or dynamic), MAC address, etc.

At step 815, the notification system receives the network identification and updates a list of network identifications. For example, the notification system may comprise a computing device that receives the network identification from the controller via network communication. The notification system may update and store the list of network identifications in memory resident at the notification system computing device, or at a remote location (e.g., a database).

At step 825, the notification system generates a message regarding peak power time of a power supplier. This may be accomplished in a manner similar to step 705, described above. The message may comprise, for example, an indication of a date, a range of time on that date, and a geographic region for which electricity provided by power supplier will incur a price increase.

At step 835, the notification system broadcasts the message to all of the network identifications on the list of network identifications. This may comprise, for example, transmitting computer readable data containing the message of step 825 over a network (e.g., Internet, LAN, WAN, wireless network, etc.).

At step 845, the controller receives the message. At step 855, the controller deten lines whether to switch the device to a secondary power source. For example, the controller may determine whether the device is within the geographic region identified by the message (e.g., by GPS, or by predetermined association with a particular grid portion). Additionally or alternatively, the controller may determine whether the secondary power supply is operable (e.g., whether a battery has enough charge to operate the device).

If the determination at step 855 is positive, then at step 865 the controller causes the device to switch from the primary power supply to the secondary power supply based upon the information in the message. For example, if the message is received at 10:00 AM on the day that a price increase is scheduled to be in effect from 1:00 PM to 3:00 PM, the controller does not immediately instruct the device to switch to secondary power, but rather waits until 1:00 PM to instruct the device to switch to secondary power. However, if the determination at step 855 is negative, then the controller does not instruct the device to switch to secondary power.

Optionally, at step 875, the controller communicates a message to the notification system via the network. The message includes an estimation of a reduction in demand from a device (or devices) that is associated with the controller. For example, a controller associated with a plurality of laptop computers may determine, using appropriate programming, the amount of useful life each laptop has available. Using historical power consumption data (or by using power consumption assumptions), the controller may determine, using appropriate programming, an estimated amount of power that will be saved by implementing a greenout. The controller may communicate this information back to the notification system, such that the primary power provider may act accordingly.

While the invention has been described in terms of embodiments, those skilled in the art will recognize that the invention can be practiced with modifications and in the spirit and scope of the appended claims.

What is claimed:

1. A method comprising:
   causing a device to discontinue using a primary power supply and begin using a secondary power supply based upon data from a notification system, the data comprising a date and time of at least one of a plurality of peak power events comprising a brownout and a blackout, of the primary power supply; and
   determining and sending to the notification system a time period which the device will use the secondary power supply.

2. The method of claim 1, wherein the device comprises a laptop computer.

3. The method of claim 1, wherein the primary power supply comprises a power grid and the secondary power supply comprises at least one of: a battery, and a back-up generator.

4. The method of claim 3, wherein the battery comprises a rechargeable battery.

5. The method of claim 1, wherein the data is transmitted through at least one of:
   an additional portion of a nominal sinusoidal alternating current signal;
   a series of on and off states of the primary power supply;
   a message broadcast by the notification system over a network; and
   a message posted by the notification system and accessed by the controller over a network.

6. The method of claim 1, wherein:
   the plurality of peak power events further comprises a price increase of the primary power supply; and
   the data comprises a geographic location of the at least one of the plurality of peak power events.

7. A computer system for implementing a greenout, the system comprising:
   a CPU, a computer readable memory and a computer readable storage media;
   first program instructions to receive a notification of a peak power time of a primary power supply;
   second program instructions to discontinue use of the primary power supply and to begin use of a secondary power supply based upon the notification, the discontinuing and the beginning being performed at a time and date specified in the notification, and the time and date being of at least one of a plurality of peak power events comprising a brownout and a blackout, of the primary power supply; and
   third program instructions to determine and send to a notification system a time period which at least one device will use the secondary power supply,
   wherein the first, second and third program instructions are stored on the computer readable storage media for execution by the CPU via the computer readable memory.

8. The system of claim 7, further comprising fourth program instructions to perform the discontinuing and the beginning in a geographic location specified in the notification, wherein the geographic location is a location of the at least one of the plurality of peak power events, and the fourth program instructions are stored on the computer readable storage media for execution by the CPU via the computer readable memory.

9. The system of claim 7, wherein the receiving comprises at least one of:
   decoding an additional portion of a nominal sinusoidal alternating current signal of the primary power supply;
   decoding a series of on and off states of the primary power supply;
   receiving a message broadcast over a network; and
   accessing, via a network, a message posted by a notification system.

10. The system of claim 7, wherein the receiving is performed by a controller and the discontinuing is performed by at least one device.

11. The system of claim 10, wherein the at least one device comprises a laptop computer and the controller comprises a program stored on the laptop computer.

12. The system of claim 10, wherein the at least one device comprises a plurality of laptop computers operatively connected to the controller.

13. The system of claim 7, wherein the primary power supply comprises a power grid and the secondary power supply comprises a battery.

14. A computer program product comprising a computer readable storage medium having readable program code embodied in the storage medium, the computer program product includes at least one component operable to:
   determine a peak power event of a primary power supply;
   notify at least one device that is capable of operating on the primary power supply and a secondary power supply of the peak power event so that the at least one device may elect to discontinue using the primary power supply and begin using the secondary power supply, the discontinuing and the beginning being performed at a time and date of the peak power event comprising one of a plurality of peak power events comprising a brownout and a blackout, of the primary power supply; and
   determine and send to a notification system a time period which the at least one device will use the secondary power supply.

15. The computer program product of claim 14, wherein the notifying comprises notifying the at least one device of a date and time of the peak power event by at least one of:
   adding a portion to a nominal sinusoidal alternating current signal of the primary power supply;
   causing a series of on and off states of the primary power supply;
   broadcasting data to the at least one device over a network; and
   posting a message to a network, wherein the message is accessible by the at least one device.

16. The computer program product of claim 15, wherein:
   the at least one device comprises a plurality of devices, and
   the broadcasting comprises sending the data to an IP address or MAC address of each of one of the plurality of devices.

17. The computer program product of claim 14, wherein:
   the discontinuing and the beginning are performed in a geographic location of the peak power event comprising one of the plurality of peak power events;
   the notifying comprises notifying the at least one device of a date and time of the peak power event by at least one of:
   adding a portion to a nominal sinusoidal alternating current signal of the primary power supply; and
   causing a series of on and off states of the primary power supply;

the at least one component is further operable to determine and send an estimation of a reduction in demand from the at least one device for the primary power supply.

\* \* \* \* \*